W. J. LAUSTERER.
VOTING MACHINE.
APPLICATION FILED JUNE 4, 1910.

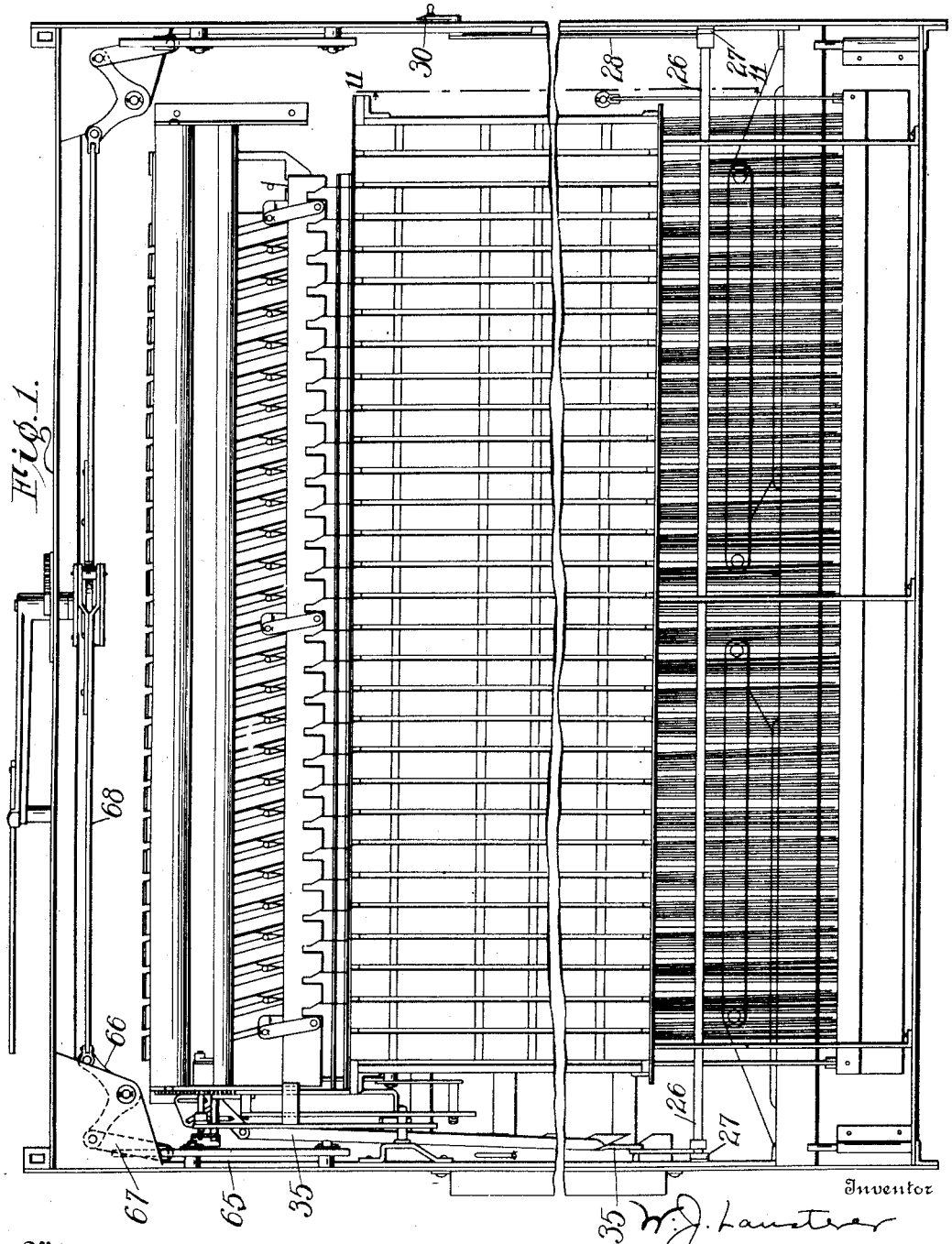

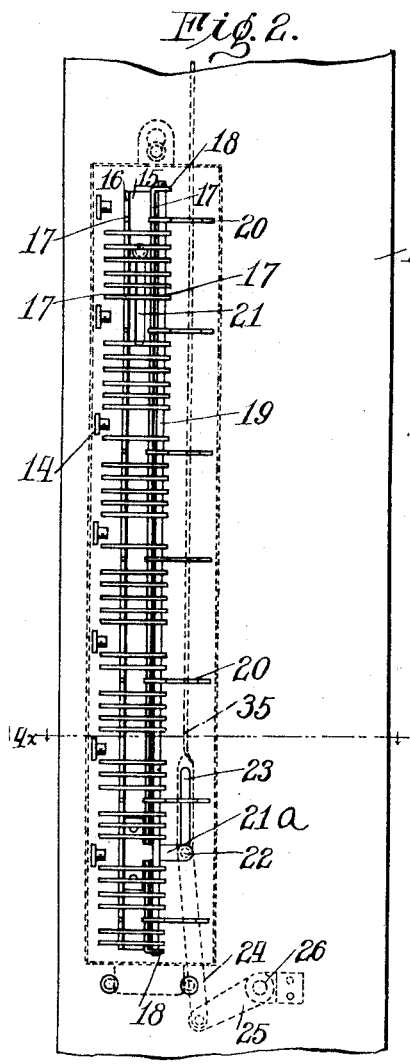
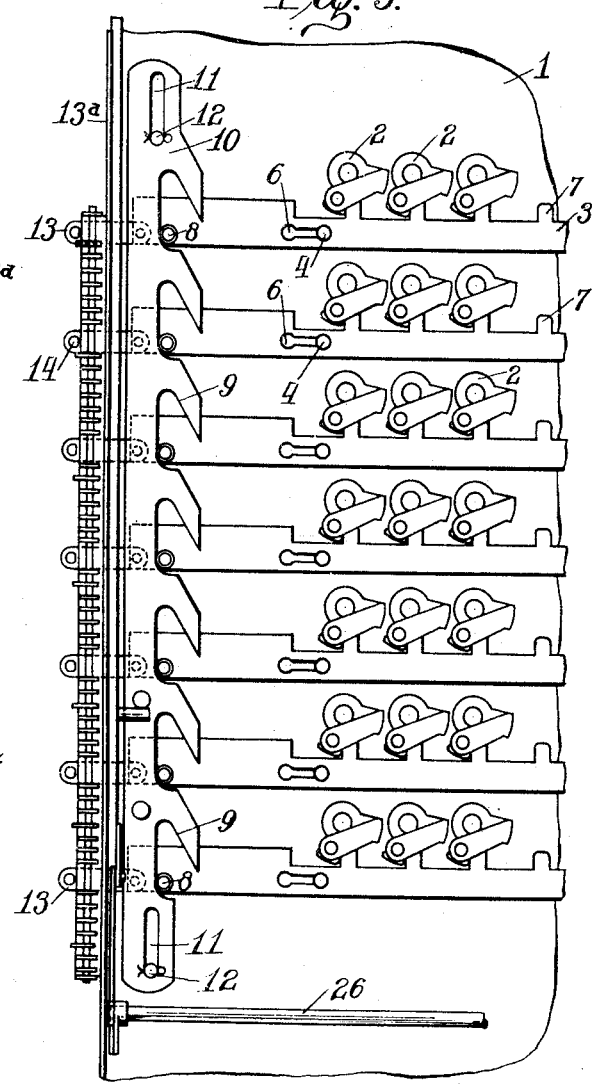
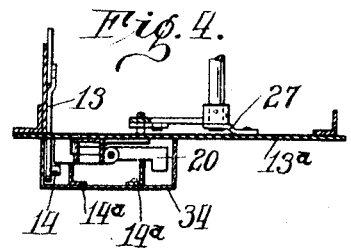
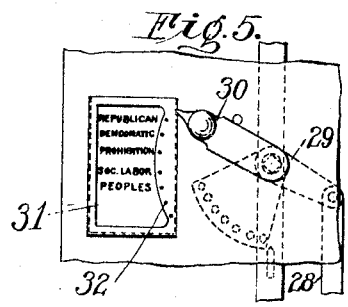

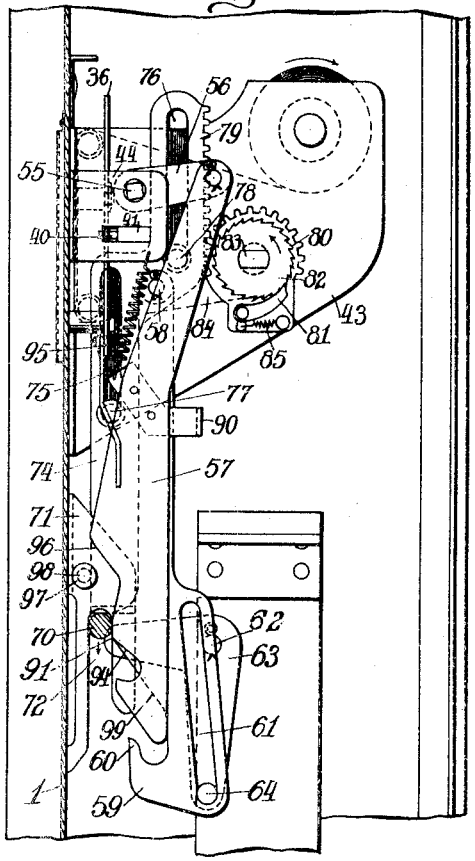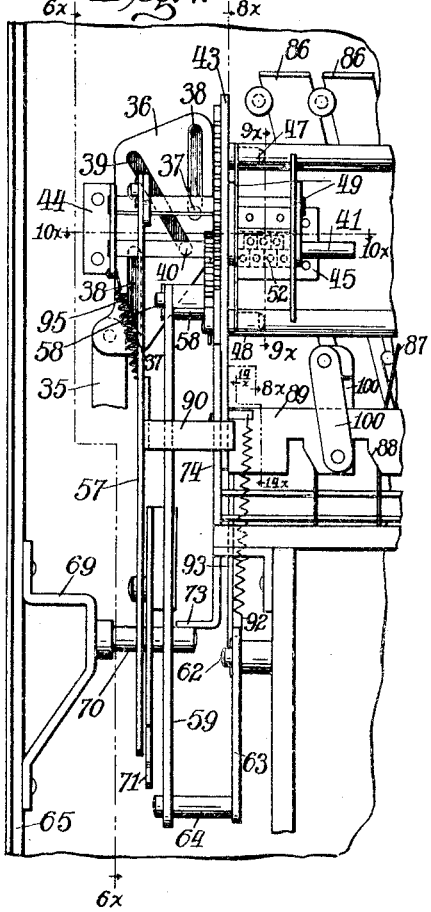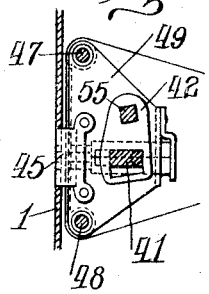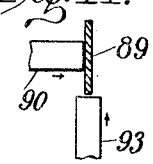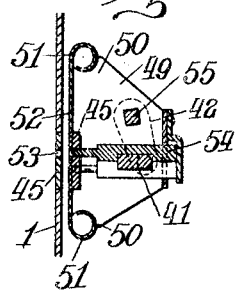

1,194,337.

Patented Aug. 8, 1916.
5 SHEETS—SHEET 4.

Witnesses
A. B. Corcilius
Alice M. Johanns

Inventor
W. J. Lausterer

By Frank Keifer
Attorney

W. J. LAUSTERER.
VOTING MACHINE.
APPLICATION FILED JUNE 4, 1910.
1,194,337.
Patented Aug. 8, 1916.
5 SHEETS—SHEET 5.
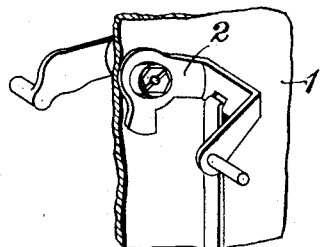
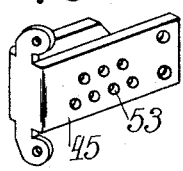
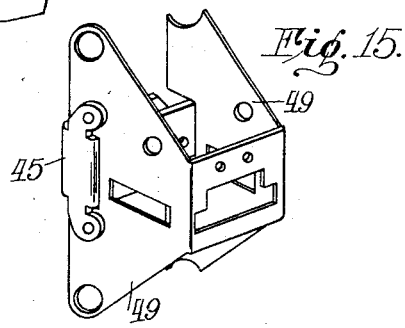
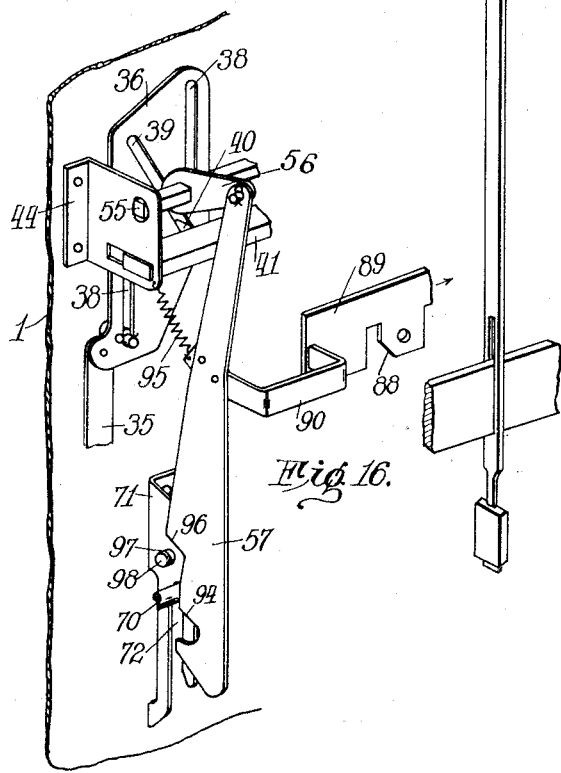
Witnesses
A. B. Corcilius
Lena M. Ash.
Inventor
W. J. Lausterer
By Frank Reifer
Attorney

UNITED STATES PATENT OFFICE.

WILLIAM J. LAUSTERER, OF JAMESTOWN, NEW YORK, ASSIGNOR, BY MESNE ASSIGNMENTS, TO EMPIRE VOTING MACHINE COMPANY, A CORPORATION OF NEW YORK.

VOTING-MACHINE.

1,194,337. Specification of Letters Patent. Patented Aug. 8, 1916.

Application filed June 4, 1910. Serial No. 565,146.

*To all whom it may concern:*

Be it known that I, WILLIAM J. LAUSTERER, a citizen of the United States, residing at Jamestown, in the county of Chautauqua and State of New York, have invented certain new and useful Improvements in Voting-Machines, of which the following is a specification.

My present invention relates to that class of voting machines described in my prior applications Nos. 446,014, 448,431 and 462,835 and Patents Nos. 820,802, 945,714 and 950,157 in which the keys of the various party rows may be grouped in several groups, with one, two or more party rows in each group, with a lockout for such groups so that a voter may be limited by the election officer to any predetermined group permitting such voters to vote on any or all of the keys of that particular group and preventing him from voting on the keys of any other group while the keys are still set. This is the usual arrangement for primary elections. In addition thereto I provide for the use of the irregular balloting mechanism in primary elections so that the voter may vote for some candidate whose name does not appear on the particular part of the machine to which he is restricted by the setting of the primary lockout. To vote for such candidate the voter will raise the slide at the top of the machine and write the name of the candidate on the web of the paper roll exposed thereby.

My invention includes mechanism which will mark the paper roll in a manner to identify the politics of the voter who voted for such candidate irregularly the paper roll being in such case marked to indicate the portion of the machine to which such voter was restricted. It being understood that if the candidate thereby voted for is not affiliated with the particular party with which such voter was affiliated such vote should not be counted.

Figure 10:
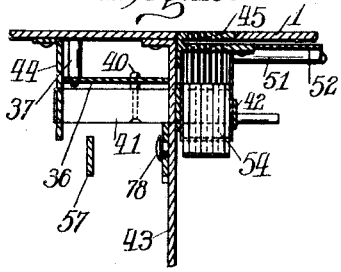
Figure 11:
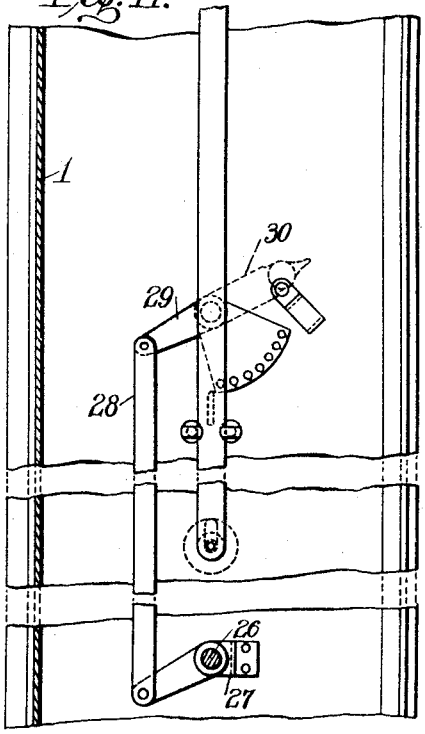
Figure 12:
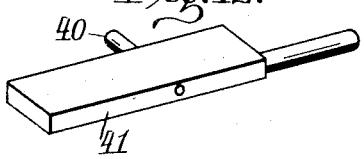
Figure 13:
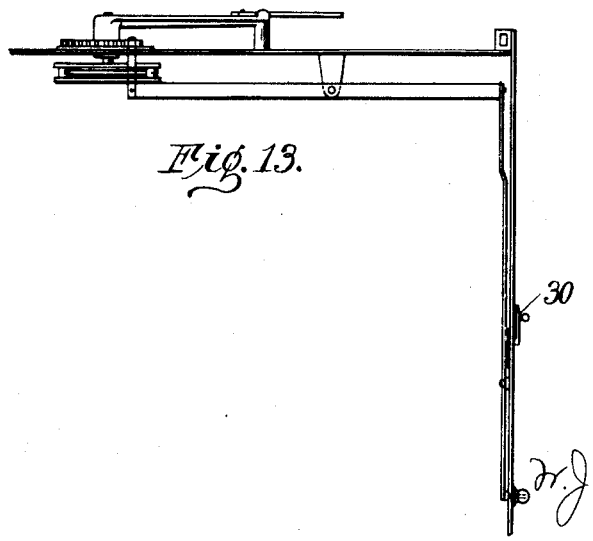

In the accompanying drawings Figure 1 is a rear elevation of the voting machine, showing my improvements, the working parts appearing exposed as much as possible. Fig. 2 is an end elevation of the machine at the left as shown in Fig. 1. Fig. 3 is a detail view showing a portion of the machine at the left end of Fig. 1. Fig. 4 is a section of the line $4^x$—$4^x$ of Fig. 2. Fig. 5 is a side elevation of the pointer by which the primary lockout is operated. Fig. 6 is a section of the line $6^x$—$6^x$ of Fig. 7. Fig. 7 is an enlarged detail of a portion of the irregular balloting mechanism as it appears in the upper left hand corner of Fig. 1. Fig. 8 is a section on the line $8^x$—$8^x$ of Fig. 7. Fig. 9 is a section on the line $9^x$—$9^x$ of Fig. 7. Fig. 10 is a horizontal section on the line $10^x$—$10^x$ of Fig. 7. Fig. 11 is a section on the line $11^x$—$11^x$ of Fig. 1. Fig. 12 is a perspective view of the sliding bar that drives the punches. Fig. 13 is a sectional elevation showing the curtain lever and controlling mechanism therefor. Fig. 14 is a section on the line $14^x$—$14^x$ of Fig. 7. Fig. 15 is a perspective view of the bracket for carrying the punches. Fig. 16 is a perspective view of the mechanism for operating the punches. Fig. 17 is a side elevation of the hook for operating the punches and the rack bar for operating the paper roll. Fig. 18 is a perspective view of the guide plate for the punches. Fig. 19 is a perspective view of one of the keys or vote indicating devices and the parts connected thereto.

In the accompanying drawings like reference numerals indicate like parts in the several figures.

Reference numeral 1 indicates the keyboard of the machine. On the keyboard 1 are mounted indicators 2, 2 arranged in parallel horizontal party rows and in vertical transverse office lines. Extending parallel to each party row of keys is a locking bar 3, one for each party row of keys. These bars are mounted to slide on the studs 4—4 with which studs, the bars engage by the slots 6—6 formed in the bars. These bars carry thereon lugs 7 which are intended to engage with the indicators 2, 2 for the purpose of locking them against operation. One of these lugs is provided for each key and the lugs are placed on the bars a distance between centers equal to the distance between centers of keys. The bars 3 with the lugs 7 are formed from suitable strips of sheet metal or corresponding thin flat bars of metal from which are punched at suitable intervals recesses as illustrated in Fig. 3 leaving between the recesses the lugs 7.

Mounted on the bar 3 is a stud 8 having an anti-friction sleeve or collar thereon by which said bar 3 is engaged by the cam 9 one of which cams is provided on the resetting bar 10 for each of the locking bars 3 on the machine. This resetting bar 10 is mounted at the left end of the machine as shown in Fig. 3 and is provided for the purpose of resetting and locking the sliding bars 3. This bar 10 has a slot 11 in each end thereof by which slots it engages the studs 12—12 which studs are mounted on the plate 1.

Connected to each of the bars 3 at the left hand end is a link 13. Each of these links 13 extends through the end plate 13$^a$ of the machine. Mounted on the outer end of each of these links 13 is a stud 14. Mounted on the end plate 13$^a$ of the machine is a frame 15 composed of a channel made of a plate of sheet metal bent up at the sides. These are slotted at suitable intervals as shown at 17—17 in Fig. 2. At the upper and lower end of the frame 15 lugs 18 are bent over in which is carried a shaft 19 on which is pivoted a series of dogs 20, there being shown in Figs. 2 and 3 seven series of these dogs one series for each locking bar 3. In each of these series there are seven dogs 20 each of these dogs being capable of engaging with the stud 14 on the link 13 for the purpose of locking the bar 3 against operation as will presently appear. This frame 15 is mounted on the machine with a limited vertical movement. To provide for this vertical movement the slot 21 is formed near the upper end of the frame 15 which slot engages with a stud mounted on the casing of the machine. Riveted to the lower end of the frame 15 is a T bracket 21$^a$ which has a stud 22 thereon which stud passes through a slot 23 formed in the end of the machine and engages with a link 24 which link is in turn pivotally engaged with a crank 25 mounted on the shaft 26. This shaft 26 extends through the machine as shown in Fig. 1 being journaled at its ends in bearings carried by brackets 27—27 on the insides of the end plates of the machine. Fastened or keyed to the right hand end of the shaft 26 as shown in Fig. 1 is a crank to which is connected the link 28 which extends upwardly to a similar crank 29 mounted to rotate in the end plate (see Fig. 5). Keyed to this crank 29 is the handle 30 mounted on the outside of the end plate by the oscillation of which through the foregoing train of mechanism the shaft 26 is rocked and the frame 15 is shifted up and down.

Mounted on the end plate opposite the pivoted handle 30 is a label holder 31 in which can be inserted a cardboard label bearing the names of parties arranged thereon in a suitable sequence. To insure the proper spacing of the names of parties perforations 32 are made in the label holders. The names of the parties should be spaced opposite these perforations. As the handle 30 is oscillated to point to the 1st, 2nd or 3rd of these perforations in succession the frame 15 will be moved endwise to bring the 1st, 2nd or 3rd of its locking dogs 20 of each series into engagement with the studs 14 mounted on the ends of the links 13 on the locking bars 3 thereby locking the bar 3 against endwise movement. As is shown in Fig. 2 in each series of the dogs 20, six of the dogs are shown in locking position and one of the dogs is shown in idle or unlocking position. In the first and second series the first dog in each case is shown in idle position. In the third and fourth series the second dog is shown in idle position. In the fifth series the third dog is shown in idle position. In the sixth series the fourth dog and in the seventh series the fifth dog is shown in idle position. When the operating lever 30 is placed opposite the first perforation in the label holder the frame 15 will be shifted vertically to bring the first dog in each of the seven series opposite or under the stud 13 connected to the locking bar 3. As shown in Fig. 2 the first and second locking bars will not be locked against movement while all the other bars will be locked against movement. If the lever 30 is pointed to the second perforation (shown in Fig. 5) the third and fourth locking bars 3 will be released while the remaining locking bars 3 will be held against operation. If placed in the third position the fifth locking bar will be released. If placed in the fourth position the sixth locking bar will be released, and if placed in the fifth position the seventh locking bar will be released, while the other locking bars will be held against operation. When the locking bar is released by the vertical movement of the frame 15 any of the keys in the party row to which that bar belongs may be operated to voted position while all other keys will be held in locked position. As shown in Fig. 2 the keys in all party rows will be released. This corresponds to the position of the pointer 30 in Fig. 5. If the pointer 30 is pointed to the first perforation the keys in the first and second party rows will remain released and the others will be locked. If pointed to the second perforation the keys in the third and fourth party rows will be released and the others will be locked. The keys in the fifth, sixth and seventh rows may be unlocked in like manner leaving the keys in the other party rows locked as above described.

It will now be seen that by arranging the dogs 20 of the various groups in different combinations the keys of the voting machine may be locked by party rows in corresponding combinations by simply shifting the frame 15 up or down to bring it to the necessary position to secure this result. All of the keys may be divided between three groups or two groups if it be so desired.

The dogs 20 are normally concealed by a cover 34 detachably secured to the end of the casing. At the upper end of the cover is a stud with a large head thereon which stud passes through a corresponding opening in the end of the machine. By shifting the cover endwise this stud engages with the end plate locking the cover in position at its upper end. The lug on the bottom of the cover engages with a pair of studs mounted on the end of the machine so that by moving the cover endwise it is locked in position both at its top and bottom. When the cover is removed the dogs 20 may be arranged according to the needs of the ticket to be voted on the machine and when the cover is replaced the dogs will be held in the position in which they have been placed by the ribs 14$^a$, 14$^a$ mounted on the inside of the cover.

Pivoted on the stud 22 is a link 35 that extends up to the irregular ballot mechanism. At its upper end it is connected to the cam plate 36 which cam plate engages with studs 37—37 mounted on the front of the machine with which stud said plate 36 maintains a sliding engagement by reason of the slots 38—38. Cut in this plate 36 is the cam slot 39 with which cam slot engages a stud 40 mounted on the sliding bar 41. This bar 41 is mounted to have an endwise movement due to the cam 39 and a lateral movement due to the cranks 42 as will now be explained. Mounted on the front plate 1 are the brackets 43 and 44. Mounted on the bracket 43 are the studs 47 and 48. The U-shaped bracket 49 is mounted on the studs 47 and 48 on one side being perforated to engage therewith and on the other side it has its corresponding corners rounded out at 50 to engage with the beads 51, 51 on the platen 52. The bracket 49 is first placed in position by engaging it with the studs 47 and 48 as shown in Fig. 8 after which it is held in position by engaging the beads 51—51 of the platen 52 with the studs 47 and 48 thus holding one side of the bracket 49 between the bracket 43 and the platen, the other side of the bracket 49 being engaged by the beads 51 as above described. The bracket 49 is spaced from the bracket 43 by suitable collars. Riveted to the bracket 49 is the U-shaped bracket 45, see Fig. 8, one side of which his sunk in and lies flush with the front plate 1. This bracket 45 is perforated with seven perforations 53 which perforations extend through both sides of the bracket. Carried in the bracket 49 are seven punches 54 each of which punches works back and forth in the perforation 53 in the bracket 45 provided therefor. These punches are arranged in two rows as shown, 4 punches in the lower row and three in the upper row. These punches are all alike and each of them is recessed as shown in Fig. 9 for engagement with the bar 41. The cranks 42 are mounted on the square shaft 55 and by the oscillation of this shaft the cranks 42 are rocked back and forth. These cranks 42 engage with the bar 41 in the manner illustrated in the Figs. 8 and 9 so that as the shaft 55 is oscillated the bar 41 is moved forward and back carrying with it the punches 54 or those punches that are in engagement with rectangular portion of said bar. This bar 41 is cut away at one end preferably to the form of a round pin or stud of such reduced dimensions that said pin as the bar 41 is moved forward and back will not affect the position of punches 54 opposite which said reduced portion of the bar 41 may lie when the bar 41 is moved forward and back. By giving the bar 41 an endwise movement the rectangular portion thereof represented in Figs. 8 and 9 will be disengaged successively from the punches 54 so that such punches from which it is disengaged will not be affected by the bar's forward and backward movement, when it is oscillated by the shaft 55. As previously explained the shifting of the bar longitudinally is secured by the cam plate 36 which is shifted by the link 35, shaft 26 and handle 30. The mechanism by which these punches are operated forward and back I am now about to describe. Mounted in the brackets 44 and 49 is the shaft 55. Keyed to this shaft is the crank arm 56 to which is connected the hook 57. Mounted on the stud 58 is the connecting rod 59 having at its lower end in front a hook 60 and at the back a slot 61. Mounted on the stationary stud 62 is the bell crank 63 having at its lower end a stud 64 mounted thereon which stud engages with the slot 61 in the connecting rod 59. Mounted to travel vertically within each side of the casing at the front is an operating bar 65 Fig. 1 which bar at the top is connected to the bell crank 66 through the link 67. This bell crank 66 is in turn connected by the link 68 to the curtain lever in the middle of the top of the machine or the parts operated thereby as is fully described in my prior application and patents above referred to.

The oscillation of the curtain lever moves the bar 65 up and down. Mounted on this bar is a bracket 69 on which in turn is mounted a stud 70. Mounted on the front plate 1 is a bracket 71 having a slot 72 thereon provided for the purpose of guiding the stud 70 in its movement. The outer end of the stud 70 engages with the upturned end 73 of the rack bar 74. This bar has two parallel slots 75 and 76 therein by which it engages studs 77 and 78 mounted on the bracket 43 by which studs said rack bar is limited to longitudinal movement. Cut on this rack bar 74 is the rack 79 engaging with the mutilated gear 80. On this mutilated gear is mounted the pawl 81 which engages with the ratchet wheel 82 keyed to the shaft 83 by which shaft the paper web 84 is drawn forward. The pawl 81 is pressed forward into engagement with the ratchet wheel 82 by the spring 85. The mutilated gear is mounted loosely on the shaft 83 and is free to rotate thereon independent of the shaft. Mounted on the rack bar 74 is the stud 58 on which is pivoted the connecting rod 59 heretofore described.

Mounted on the front plate are the irregular balloting slides 86—86. To each of these slides is connected an interlocking strap 87. When one of these slides is lifted the straps 87 are lifted therewith as well, in the manner illustrated in the prior application No. 113,686 and Patent 820,802. Each of these straps is provided with a square shoulder which engages with the cam surface 88 on the bar 89 causing said bar to move to the right from the position shown in Fig. 7. This movement of the bar 89 is caused by the operation of any of the slides 86 and until one of the slides is operated and the bar is moved to the right, the paper web 84 will remain inactive keeping the same surface presented under the slides. It is of course, unnecessary to feed the paper except when a vote has been cast thereon and a vote can not be cast thereon except by raising a slide 86 and moving the bar 89 to the right as above explained.

The effect that the movement of the bar 89 has upon the feeding of the paper I will now explain. The rack bar 74 operates to rotate the shaft 83 and thereby causes the feed of the paper web. This rack bar normally remains inoperative and is operated by the curtain lever only when one of the slides 86 has been lifted. Until then the hook 60 remains out of engagement of the stud 70. This is secured as follows:—Connected to the upper arm of the bell crank 63 is the latch 93 which if the bar 89 remains in the position shown in Fig. 7, will move up until its further movement is arrested by said bar. Ordinarily this latch is held slightly out of engagement with the bar 89 so that the bar 89 will be the more free to move endwise making the movement thereof by the slide 86 and the interlocking straps 87 somewhat easier.

The connecting rod 59 has formed thereon a lug 91 which when the stud 70 is held in position as shown in Fig. 6 bears against the stud. This of itself holds the hook 60 out of the line of travel of the stud. When the stud begins to descend with the bar 65, due to the operation of the curtain lever, the hook is then released and is free to swing forward until the latch 93 engages with the bar 89. This forward movement is due to the effect of the spring 92 pulling on the arm of the bell crank 63. Ordinarily gravity could be depended upon to pull this hook forward but the spring makes the action somewhat quicker.

I secure the forward movement of the paper web as follows: The slides 86 if moved at all must be moved before the backward operation of the curtain lever begins and before the latch 93 begins its upward travel so that thereafter it is not objectionable to permit the latch 93 to bear against the bar 89. As long as the latch 93 remains in engagement with the bar 89, the hook 60 will remain out of the line of travel of the stud 70 and the rack bar 74 will remain idle. If, however, the bar 89 has been moved to the right it will not limit the upward travel of the latch 93 so that the spring 92 will swing the bell crank lever 63 far enough to throw the hook 60 into engagement with the stud 70. As this stud 70 descends due to the operation of the curtain lever it will engage with the hook 60 and draw down the connecting rod 59 and with it the rack bar 74 on which it is pivotally mounted, causing the rotation of the mutilated gear 80, the ratchet wheel 82 and the shaft 83, to which shaft the paper web is securely connected.

It will be noticed in Fig. 6 that the hook 60 is placed a considerable distance below the stud 70 so that the stud 70 must necessarily travel that far before it can engage with the hook and cause the movement thereof. This of course delays the operation of the paper roll until comparatively late in the movement of the stud 70 and in the mean time I compel the stud 70 to operate the punches 54 to perforate the paper on which a vote has been cast. These punches are operated by the rocking of the shaft 55 which shaft is rocked by the hook 57 which will engage with the stud 70 provided the slide has been lifted. Until a slide has been lifted I prevent the engagement between the hook 57 and the stud 70 by the following arrangement. Carried on the hook 57 is the yoke 90 which passes around the connecting rod 59 and the rack bar 74 and engages with the bar 89 when the bar 89 is in the position shown in Fig. 7. This yoke operates as a latch and holds the hook 57 from swinging into engagement with the stud 70. If the bar 89 has been moved to the right by the operation of any of the irregular slides the hook is free to swing in and engage with the stud 70. The hook 57 has a cam 94 thereon which engages with the stud 70 when in the position shown in Fig. 6 by which engagement the yoke 90 is normally held slightly out of engagement with the bar 89 leaving the bar more easily moved by the slides 86. After the operation of the curtain lever has begun, the stud 70 moves down and the hook 57 is then free to move forward except as it may be arrested by the yoke 90 engaging with the bar 89. If the bar 89 has been moved to the right by the operation of any of the slides 86 the hook 57 will then be free to continue its forward movement impelled thereto by the spring 95. This will draw the hoop into engagement with the stud 70 which will draw the hook down and oscillate the shaft 55 causing the forward operation of the punches 54.

After the forward operation of the punches is completed the hook 57 must be disengaged from the stud 70 and to accomplish this purpose I provide the cam 96 on the hook 57 which cam reacts against the antifriction roller 97 on the stud 98 supported on the bracket 71. This pushes the hook back out of engagement with the stud leaving the spring 95 to draw the hook up which will oscillate the shaft 55 in the reverse direction and pull the punches 54 out of the paper. The punches will be thus withdrawn before the stud 70 comes into engagement with the hook 60 and before the forward feed of the paper web 84 begins, otherwise the paper would be torn.

When the stud 70 engages with the hook 60 the connecting rod 59 and the rack bar 74 are carried down with it to the end of its movement. These parts will remain down until the curtain lever is moved in the reverse direction which movement in the reverse direction will cause the raising of the stud 70. As the stud 70 rises it comes into contact with the cam 99 on the connecting rod 59 the reaction of which cam against the stud will cause the connecting rod 59 to swing backward rocking the bell crank 63 and pulling down the latch 93. As the stud 70 continues to travel up it will engage with the bent-over end 73 of the rack bar 74 causing the rack bar to be lifted and with it the connecting rod 59 thus restoring these parts to normal position. The stud 70 in its elevated position holds the hook 57 with its yoke 90 out far enough so that it does not engage with the bar 89. The stud also holds the connecting rod 59 back far enough so that through the bell crank 63 the latch 93 is held out of engagement with the bar 89 and thus the bar 89 is permitted to resume its normal position. The bar 89 is supported on swinging links 100, 100, by which the bar is slightly lifted as it is moved to the right so that it will drop back to position by the force of gravity.

The latch 93 and bar 89 in Fig. 7 are omitted from the showing in Fig. 6 as it is believed their presence would tend to confuse the figure.

Having thus described my invention what I claim as new and patentable is as follows:

1. The combination in a voting machine of locking means arranged in a plurality of rows, means normally holding said locking means against operation, said means being operable to release any one or more of said rows of locking means, a row of irregular balloting devices for voting for candidates not nominated, and recording means operable in connection with said irregular balloting device to indicate the row or rows of locking devices that may be unlocked for voting operation at a given moment.

2. The combination in a voting machine of locking means arranged in a plurality of rows, means normally holding said locking means against operation, said means being operable to release any one or more of said rows of locking devices, and a recording device to record which of said rows of locking devices is released, said recording device being set by the operation of said means.

3. The combination in a voting machine of locking devices arranged in a plurality of rows, means normally holding said locking devices against operation, said means being operable to release any one or more of said rows of locking devices, a recording device indicating which of said rows of locking devices is released, and additional means operable by the voter to cause the operation of said recording device to record the unlocking of said rows.

4. The combination in a voting machine of locking devices arranged in a plurality of rows, means normally holding said locking devices against operation, said means being operable to release any one or more of said rows of locking devices, and a recording device connected to and moved by said means capable of recording marks indicating the setting of said means.

5. The combination in a voting machine of a frame, a stationary rod thereon, and a plurality of locking dogs pivoted on said rod.

6. The combination in a voting machine of a frame, a stationary rod thereon, and a plurality of locking dogs pivoted on said rod, said frame being movable endwise with its dog.

7. In a voting machine, a lockout comprising a frame, a plurality of dogs pivoted thereon in groups, and a locking bar for each group controlled by the dogs thereof, said frame being movable to engage each of said dogs in turn with its locking bar.

8. In a voting machine, a lockout comprising a frame, a plurality of dogs pivoted thereon in groups, and a locking bar for each group controlled by the dogs thereof, said frame being movable to engage each of said dogs in turn with its locking bar, and each of said dogs being independently operable on the frame to engaging or idle position.

9. In a voting machine, a lockout comprising a frame, a plurality of locking dogs pivoted thereon in groups, each of said dogs being movable to either of two positions, and means for holding all of said dogs set in such positions.

10. In a voting machine, a lockout comprising a frame, a plurality of dogs pivoted thereon in groups, each of said dogs being movable to either of two positions, means for holding all of said dogs set in such positions, and means for moving the frame without disturbing the setting of the dogs.

11. The combination in a voting machine of a frame, a rod carried thereon, dogs pivoted on said rod, and spaced apart, and a bar on said frame having recesses therein with which said dogs can engage, said dogs being freely movable to engage with or disengage from said bars.

12. The combination in a voting machine of a frame, a rod carried thereon, dogs pivoted on said rod, and spaced apart, and a bar on said frame having recesses therein with which said dogs can engage, said dogs being divided by said collars and said recesses into groups, with an equal number of dogs in each group, said groups and the dogs therein being spaced evenly apart.

13. The combination in a voting machine of a frame, a rod carried thereon, dogs pivoted on said rod, and spaced apart, a bar on said frame having recesses therein with which said dogs can engage, said dogs being divided by said collars and said recesses into groups, with an equal number of dogs in each group, said groups and the dogs therein being spaced evenly apart, and means for moving said frame progressively by steps equal to the distance between centers of dogs in any one group.

14. The combination in a voting machine of locking means arranged in parallel rows, a locking bar for each row normally holding said locking means against operation, said bars being movable endwise to hold or release the locking means in their respective rows, a stud connected to the end of each locking bar, said studs being normally arranged in a row, a lockout frame movable across said studs, and dogs carried on said frame in groups, one group for each stud, said frame being movable to engage each of said dogs in a group with the stud controlled by said group.

15. The combination of a lockout frame movable to a series of positions, and a recording device connected thereto to be set thereby, said recording device changing its indication for each successive position of the lockout frame, whereby the position of the lockout frame may be indicated.

16. The combination of a lockout frame movable to a series of positions, a recording device connected thereto to be set thereby, said recording device changing its indication for each successive position of the lockout frame, whereby the position of the lockout frame may be indicated, and means for operating said recording device.

17. The combination in a voting machine of a paper roll recording and voting device, a punching device for perforating said roll with one or more perforations, a lockout connected to said punching device to set the device for making one or more perforations in the paper roll, and means for operating said device.

18. The combination in a voting machine of locking means arranged in a plurality of rows, a paper roll voting and recording device mounted parallel thereto with a frame mounted adjacent to said roll, a series of punches mounted therein in two rows, a bar placed between said rows of punches capable of engaging all of said punches in both rows, said punches being movable by said bar to operate on said paper roll, and means operating to release any one or more of said rows of locking devices, said means being connected to and operated with said bar.

19. The combination in a voting machine of locking means arranged in a plurality of rows, a paper roll voting and recording device mounted parallel thereto, a punching device for operating on said roll, a plurality of punches carried thereon, a bar movable to engage with one or more of said punches, means for moving said bar to operate the punches engaged therewith, and a device connected to said means and operating therewith to lock or release one or more rows of said locking means.

20. The combination in a voting machine of a frame, a series of punches mounted thereon in two rows, a bar placed between said rows of punches capable of engaging all of said punches in both rows, said bar being movable endwise to engage one or more of said punches, locking means on the machine arranged in a plurality of rows, devices normally holding said locking means against operation by rows, and means connected to said bar for controlling said devices.

21. The combination in a voting machine of a frame, a series of punches mounted therein in two rows, a bar placed between said row of punches capable of engaging all of said punches in both rows, said bar being movable endwise to engage one or more of said punches, said bar being movable sidewise to cause the operation of all punches in engagement therewith, locking means on the machine arranged in a plurality of rows, devices normally holding said locking means against operation by rows, and means connected to said bar for controlling said devices.

22. The combination in a voting machine of an operating mechanism therefor, a bar movable endwise and operated thereby, a stud carried thereon, a cam bar adjacent to said bar, and two studs placed thereon at a suitable distance apart both of which studs are engaged by the stud on the first named bar, whereby said second bar is moved by the first bar a distance substantially equal to the travel of the first named bar plus the thickness of the stud thereon minus the distance between the studs on the second named bar.

23. The combination in a voting machine of a lockout frame a cam connected thereto, a bar movable longitudinally by said cam, and one or more punches engaged by said bar for operation thereby.

24. The combination in a voting machine of a lockout frame, a cam connected thereto, a bar movable longitudinally by said cam, one or more punches engaged by said bar and means for moving said bar laterally to operate said punches.

25. The combination in a voting machine of a lockout frame, a cam connected thereto, a bar movable longitudinally by said cam, punching means engaged by said bar, and controlling means for moving said bar laterally to operate said punching means, said controlling means operating on the operation of certain voting devices on the machine.

26. The combination in a voting machine of means for supporting a paper web for recording votes, slides concealing said web, and a punch device for perforating said web, said punching device operating to perforate said web upon the operation of any one or more of said slides.

27. The combination in a voting machine of means for supporting a paper web for recording votes, slides concealing said web, a punching device for perforating said paper web with a number of perforations variable with each operation thereof, and means for successively operating said punching device and feeding the paper, said means being set for operation by the movement of any one of the slides.

28. The combination in a voting machine of a series of punches arranged in two rows, a bar sliding between said rows to engage each punch in succession, the punches of one row being staggered with the punches of the other row, means for supporting a paper web for receiving votes thereon, slides for concealing said web, and means for operating said punches to perforate said web, said means being set for operation by the movement of any of the slides.

29. The combination in a voting machine of a series of punches, a sliding bar arranged to engage said punches successively, cranks supporting said bar and means for rocking said cranks to reciprocate said punches, means for supporting a paper web on which said punches are adapted to operate, said web being adapted to receive votes thereon, and slides for concealing said web, said slides operating to set for movement the devices for reciprocating the punches.

30. The combination in a voting machine of a series of punches, a sliding bar arranged to engage said punches successively, cranks supporting said bar, means for rocking said cranks to reciprocate said punches, means for supporting a paper web perforated by said punches, means to feed said paper, and slides for concealing said web, said slides operating to set for movement the devices for reciprocating the punches.

31. The combination in a voting machine of a series of punches, a sliding bar arranged to engage said punches successively, cranks supporting said bar, means for rocking said cranks to reciprocate said punches, means for supporting a paper web perforated by said punches, means to feed said paper, and slides for exposing said paper web, the action of said punches, means to feed said paper, and dependent on the operation of one or more of said slides.

32. The combination in a voting machine of an operating mechanism therefor, a stud thereon, a plurality of hooks positioned to be engaged thereby, a punching device operated by one of said hooks, and a paper web feeding device engaged by the other hook.

33. The combination in a voting machine of a lockout capable of being placed in a plurality of positions, a shaft connected to said lockout and extending through the machine, a lever connected to said shaft for operating said lockout, a sector plate connected to said shaft having studs thereon with intervals therebetween, and means operated by the machine to engage between consecutive studs and hold said lockout in a fixed position during the operation of the machine.

34. The combination in a voting machine of an operating member, a stud carried thereon, a rack bar, a hook pivoted on said rack bar with which said stud is capable of engaging, voting devices on said machine, and a bar common to all of said devices, said bar being moved endwise by any of said voting devices to release said hook for engagement with and movement by said stud.

35. The combination in a voting machine of an operating member, a stud carried thereon, a rack bar, a hook pivoted on said rack bar with which said stud is capable of engaging, voting devices on said machine, a bar common to all of said devices, said bar being moved endwise by any of said voting devices to release said hook for engagement with and movement by said stud, and a gear in engagement with said rack bar and operated thereby.

36. The combination in a voting machine of a perforating device, a hook for operating said perforating device, an operating device for said machine having a stud thereon with which said hook is normally out of engagement, voting devices, and a member operated thereby to release said hook for engagement with said stud and operation thereby.

37. The combination in a voting machine of means for supporting a paper web, voting devices concealing said web, and means set by the operation of any of said voting devices for subsequently and successively punching and feeding said paper, said means being capable of punching said paper with one or more perforations, variable in number with each operation thereof.

38. The combination in a voting machine of means for supporting a paper web, voting devices concealing said web, a single punching device common to all said voting devices and being capable of being set for operation thereby, and means operating subsequently to the operation of any of said voting devices for punching the web and feeding it.

39. The combination in a voting machine of means for supporting a punching mechanism and a paper web, hooks for operating one and feeding the other, said hooks remaining normally idle, a universal bar normally holding said hooks in idle position during the operation of the machine, means for moving said bar to release said hooks, and means for holding said hooks out of contact with said bar during the movement of said bar.

40. The combination in a voting machine of a punching mechanism, a hook for operating said punching mechanism, said hook remaining normally idle, a universal bar normally holding said hook in idle position during the operation of the machine, means for moving said bar to release said hook, and means for holding said hook out of contact with said bar during the movement of said bar.

41. The combination in a voting machine of means for supporting a paper web, a hook for operating said web, said hook remaining normally idle, a universal bar normally holding said hook in idle position during the operation of the machine, means for moving said bar to release said hook, and means for holding said hook out of contact with said bar during the movement of said bar.

42. In a voting machine, the combination with a casing having a voting aperture and means for feeding a paper strip past said aperture in a position to permit a vote to be written thereon, of means for marking said strip and means to control the position of the mark on said strip.

43. In a voting machine, the combination with a casing having a voting aperture and means for feeding a paper strip past said aperture in a position to permit a vote to be written thereon, of means for marking said strip, manually adjustable means to vary the mark so made, and separate means for indicating the adjustment of said varying means.

44. In a voting machine, the combination with voting members and primary locking mechanism for said voting members, of means for feeding a paper strip, means for marking said strip, and means connecting with said primary locking means for varying the mark made on said strip.

45. In a voting machine, the combination with indicators, of means for locking certain of said indicators against actuation, and recording means actuated by said locking means for distinguishing locked from unlocked indicators by a permanent record.

46. In a voting machine, the combination with indicators arranged in groups, of means for locking certain of said groups against actuation and leaving the indicators of another group unlocked, and recording means for distinguishing locked from unlocked groups by a permanent record.

47. The combination of voting keys arranged in groups, means for making a permanent register of the irregular vote, means for locking certain of said groups against actuation, and means for distinguishing locked from unlocked groups by a permanent record on said irregular register.

In testimony whereof I affix my signature in presence of two witnesses.

WILLIAM J. LAUSTERER.

Witnesses:
INGEBORG C. HANSEN,
ETHEL C. MILLER.